United States Patent
Fu et al.

(10) Patent No.: US 12,017,685 B1
(45) Date of Patent: Jun. 25, 2024

(54) AUTONOMOUS VEHICLE LONGITUDINAL-AND-LATERAL CONTROL METHOD FOR PREVENTING MOTION SICKNESS

(71) Applicant: Zhengzhou University of Light Industry, Henan (CN)

(72) Inventors: Zhijun Fu, Henan (CN); Guobin Liu, Henan (CN); Guangyu Cai, Henan (CN); Xiaohuan Liu, Henan (CN); Chuansheng Tang, Henan (CN); Yan Lu, Henan (CN); Jinliang Wu, Henan (CN); Wenbin He, Henan (CN); Junjian Hou, Henan (CN); Dengfeng Zhao, Henan (CN); Feng Zhao, Henan (CN); Yaohua Guo, Henan (CN); Jinquan Ding, Henan (CN); Fang Zhou, Henan (CN); Changjun Wu, Henan (CN)

(73) Assignee: Zhengzhou University of Light Industry, Zhengzhou (CN)

( * ) Notice: Subject to any disclaimer, the term of this patent is extended or adjusted under 35 U.S.C. 154(b) by 0 days.

(21) Appl. No.: 18/238,513

(22) Filed: Aug. 27, 2023

(30) Foreign Application Priority Data

Mar. 6, 2023 (CN) .......................... 202310205402.4

(51) Int. Cl.
*B60W 60/00* (2020.01)
*B60W 40/06* (2012.01)

(52) U.S. Cl.
CPC ........ *B60W 60/0013* (2020.02); *B60W 40/06* (2013.01); *B60W 2710/18* (2013.01); *B60W 2720/106* (2013.01); *B60W 2720/125* (2013.01)

(58) Field of Classification Search
CPC ............ B60W 60/0013; B60W 40/06; B60W 2710/18
See application file for complete search history.

(56) References Cited

U.S. PATENT DOCUMENTS

2022/0126864 A1* 4/2022 Moustafa ............ B60W 30/182

* cited by examiner

*Primary Examiner* — Jaime Figueroa
*Assistant Examiner* — Jerrod Irvin Davis

(57) ABSTRACT

An autonomous vehicle longitudinal-and-lateral control method for preventing motion sickness is disclosed. Firstly, a vehicle dynamics model is established, and the current vehicle travelling state and road surface information are determined according to the vehicle dynamics model. After the vehicle travelling state and road surface information are acquired, the desired velocity, desired acceleration, and desired wheel turning angle are output according to a driver model for reducing occurrence of motion sickness while ensuring safety and efficiency, to carry out longitudinal-and-lateral control of the vehicle.

2 Claims, 2 Drawing Sheets

AUTONOMOUS VEHICLE LONGITUDINAL-AND-LATERAL CONTROL METHOD FOR PREVENTING MOTION SICKNESS

CROSS-REFERENCE TO RELATED APPLICATIONS

The present application claims priority of Chinese Patent Application No. 202310205402.4, filed on Mar. 6, 2023, the entire contents of which are hereby incorporated by reference.

TECHNICAL FIELD

The embodiments of the present invention relate to the technical field of vehicle control, in particular to an autonomous vehicle longitudinal-and-lateral control method for preventing motion sickness.

DESCRIPTION OF THE PRIOR ART

As an important part of the intelligent traffic system, the autonomous vehicle's principle is to use the vehicular sensor to obtain the vehicle's motion state, road information and current vehicle position, process the obtained information to analyze and judge the vehicle's safety status, plan the future driving route and speed, and use the vehicle's electronic control system to issue control commands to the vehicle's steering system and power transmission system so that the vehicle can track the planned speed and route by the cooperation of the steering system with the braking/driving systems, thereby achieving autonomous driving.

Longitudinal-and-lateral control is a fundamental problem in the study of autonomous vehicles. The longitudinal control is to control the driving/braking of the autonomous vehicle through the cooperation of the accelerator/brake pedals, so as to achieve accurate and fast tracking of the desired vehicle speed. The lateral control is to control the turning angle of the front wheel of the intelligent vehicle, so as to achieve fast and stable tracking of the planned route of the intelligent vehicle. Because the longitudinal and lateral systems of the vehicle in motion are highly nonlinear and have complex coupling relationships, it is difficult to design a stable and effective route-tracking control system. The existing longitudinal-and-lateral control methods have separate longitudinal and lateral control logics, and actually do not eliminate the mutual influences of the longitudinal and lateral controls. For example, when cornering at high speed, it is necessary to control both the steering wheel and the accelerator brake, that is, the longitudinal-and-lateral controls of the vehicle are highly coupled. Therefore, the separate longitudinal and lateral controls do not meet to the physical conditions of the vehicle and affect the driving safety of the vehicle.

Moreover, autonomous vehicles should consider not only the driving safety, but also the driving experience of passengers. Although the existing longitudinal-and-lateral control methods for autonomous vehicles can achieve automatic driving along the planed routes, the existing longitudinal-and-lateral control methods do not take the passenger's motion sickness into account. The driving behaviors such as rapid acceleration, rapid deceleration, and sudden turn during the automatic driving process suffer the passengers from unaccustomed motion stimulations, which will cause passengers to experience motion sickness. In addition to safe arrival at the destination, the most important criterion for passengers to judge the quality of self-driving experience is ride comfort. Therefore, the research on the autonomous vehicle longitudinal-and-lateral control for preventing motion sickness is of great significance for the popularization and improvement of autonomous driving.

SUMMARY OF THE DISCLOSURE

The purpose of the present invention is to solve the problem that the existing autonomous vehicle control methods do not control the automatic driving behaviors to prevent motion sickness of the passengers. When the vehicle is driven automatically or manually, it is controlled longitudinally and laterally in a cooperative manner, not only considering the safety, but also taking the prevention of motion sickness of the passengers as an objective function.

In order to achieve the above object, the present invention provides an autonomous vehicle longitudinal-and-lateral control method for preventing motion sickness. The method uses a nonlinear model predictive control algorithm to establish a driver model combining longitudinal and lateral control. The model uses the motion sickness index as one of the objective functions, and outputs the driving and steering control parameters according to the collected road surface information and the running state of the vehicle, so as to control the vehicle longitudinally and laterally in a cooperative manner, preventing passengers from feeling motion sickness while ensuring safety and efficiency, and controlling the vehicle to achieve the specified target.

An autonomous vehicle longitudinal-and-lateral control method for preventing motion sickness, including steps of:
S1: establishing a vehicle dynamics model;
S2: determining current vehicle travelling state and road surface information according to the vehicle dynamics model,
wherein the vehicle travelling state in S2 includes X, Y, $u_x$, $u_y$, r, $\delta$;
where X and Y represent lateral and longitudinal positions of the vehicle respectively, $u_x$ and $u_y$ represent vehicle longitudinal and lateral velocities respectively, r represents vehicle yaw rate, and $\delta$ represents front wheel turning angle; and
the road surface information includes lane width and road turning radius $R_{road}$;
S3: after obtaining the vehicle travelling state and the road surface information, outputting desired velocity, desired acceleration, and desired wheel turning angle according to a driver model for reducing occurrence of motion sickness while ensuring safety and efficiency;
wherein the driver model includes predictive model, cost function including multiple objective functions and limit formula, and is implemented by a nonlinear model predictive control method which is a basic algorithm; and wherein an optimal solution to the predictive model, the cost function and the limit formula is obtained by fmincon function in matlab to derive optimal travel parameters, so as to output the desired velocity, the desired acceleration and the desired wheel turning angle;
S4: carrying out longitudinal-and-lateral control of the vehicle;
wherein after obtaining the desired velocity, the desired acceleration, and the desired wheel turning angle and according to current vehicle running state, the vehicle is longitudinally controlled by controlling an accelerator and a brake to reach the desired velocity and the desired acceleration respectively, and laterally controlled by controlling a steering wheel to reach the desired wheel turning angle, so as to make the current vehicle travelling state reach a desired travelling state; and S5: repeating steps S3-S4, re-inputting output control quantity into the driver model as control quantity for next time node and controlled vehicle state into the driver model as initial state, and updating the road surface information to derive optimal travel control parameters again through the driver model, so as to provide comfortable ride experience for passenger.

Further, in step S1, the vehicle dynamics model includes a longitudinal dynamics model and a lateral dynamics model.

The longitudinal dynamic model has a formula of:

$$\dot{u}_x = \frac{F_{x,engine}}{m} - \frac{F_{x,brake}}{m} - \frac{F_{x,resis}}{m} + rv \quad (1)$$

where, $F_{x,engine}$, $F_{x,brabe}$, $F_{x,resis}$ represent engine output force, braking force, and air resistance, respectively, $\dot{u}_x$ represents vehicle longitudinal acceleration, r and v represent yaw rate and vehicle lateral velocity, respectively.

The engine output force in formula (1) has a formula of:

$$F_{x,engine} = T_e \frac{N_t N_d \eta_{th}}{R_{tire}} \quad (2)$$

where, $T_e$ represents engine torque, $N_t$ represents gearbox gear ratio, Na represents differential gear ratio, $\eta_{th}$ represents transmission efficiency and $R_{tire}$ represents effective wheel rolling radius;

The engine torque has a formula of:

$$T_e = 160 \tanh(5(\rho-0.3))+133 \quad (3)$$

where, $\rho$ represents accelerator pedalling quantity;

The braking force in formula (1) has a formula of:

$$F_{x,brake} = \frac{(T_{brake,LF} + T_{brake,RF} + T_{brake,LR} + T_{brake,RR})P}{R_{tire}} \quad (4)$$

where, $T_{brake}$ in formula (4) represents a ratio of a brake torque of a respective wheel to a pressure valve of a pressure valve, and P represents a pressure value of a main pressure valve; and The air resistance in formula (1) has a formula of:

$$F_{x,resis} = C_a \cdot u_x^2 \quad (5)$$

where $C_a$ is 0.4298; and

The lateral dynamics model is a linear two-degree-of-freedom vehicle model, and has a formula of:

$$\begin{bmatrix} \dot{u}_y \\ \dot{r} \end{bmatrix} = \begin{bmatrix} \frac{K_f + K_r}{Mu_x} & \frac{aK_f - bK_r}{Mu_x} - u_x \\ \frac{aK_f - bK_r}{u_x I_z} & \frac{a^2 K_f + b^2 K_r}{u_x I_z} \end{bmatrix} \begin{bmatrix} u_y \\ r \end{bmatrix} + \begin{bmatrix} -\frac{K_f}{M} \\ -\frac{aK_f}{I_z} \end{bmatrix} \delta \quad (6)$$

where, M represents gross vehicle mass, $u_x$ represents vehicle forward velocity, $u_y$ represents vehicle lateral velocity, r represents vehicle yaw rate, $K_f$ and $K_r$ represent equivalent cornering stiffness of front and rear axles respectively, a and b represent distances from center of mass to the front and rear axles respectively, $\delta$ represents front wheel turning angle, and $I_z$ represents moment of inertia of the vehicle around z-axis.

Further, in step S2, current parameters must be discretized to derive future state parameters in the predictive model, and the discretized predictive model has a formula of:

$$\dot{X}(k) = \frac{X(k+1) - X(k)}{\Delta t} = f(X(k), 1/R_{road}(k), U(k))$$

where the state parameter X and the control quantity U in the predictive model are respectively calculated by $X=[u_x, y_{err}, u_y, \psi_{err}, r]$ and $U=[\rho, P, \delta_{sw}]$, and $\Delta t$ represents time interval; and wherein the initial state in a model framework corresponds to current vehicle travelling state parameters, including vehicle longitudinal velocity $u_x$, lateral offset $y_{err}$, vehicle lateral velocity $u_y$, yaw rate difference $\psi_{err}$, and yaw rate r; and the control quantity is current vehicle control quantity, including accelerator pedalling quantity $\rho$, pressure value of a main pressure valve of the brake P, and steering wheel turning angle $\delta_{sw}$.

Further, in step S3, the cost function is to multiply all objective functions by respective weights and add them up, and the objective functions include time cost, desired velocity, reducing longitudinal acceleration, aligning road center, reducing yaw angle error between road and vehicle, reducing lateral velocity, steering wheel control quantity, accelerator control quantity, brake control quantity, and longitudinal and lateral acceleration control to prevent motion sickness.

In the driver model, the time cost in the objective functions has a formula of:

$$J_1(k) = \sum_{i=1}^{N} \left(\frac{1}{u_x(k+i)}\right)^2$$

where, $u_x$ represents vehicle longitudinal velocity;

The desired velocity in the objective functions has a formula of:

$$J_2(k) = \sum_{i=1}^{N} (u_x(k+i) - u_{xd})^2$$

where, $u_{xd}$ represents desired vehicle longitudinal velocity;

The reducing longitudinal acceleration in the objective functions has a formula of:

$$J_3(k) = \sum_{i=1}^{N} \left(\frac{u_x(k+i) - u_x(k+i-1)}{\Delta t}\right)^2$$

The aligning road center in the objective functions has a formula of:

$$J_4(k) = \sum_{i=1}^{N} y_{err}^2(k+i)$$

where, $y_{err}$ represents lateral offset, which is obtained by transforming road coordinates, and has a formula of:

$$\dot{y}_{err} = u_y + u_x \cdot \psi_{err}$$

The reducing yaw angle error between road and vehicle in the objective functions has a formula of:

$$J_5(k) = \sum_{i=1}^{N} \psi_{err}^2(k+i)$$

where, $\psi_{err}$ represents yaw rate difference and has a formula of $\psi_{err} = r - r_d$;
where, $$r_d = \frac{u_x}{R_{road}},$$

$R_{road}$ represents road turning radius;

The reducing lateral velocity in the objective functions has a formula of:

$$J_6(k) = \sum_{i=1}^{N} u_y^2(k+i)$$

The steering wheel control quantity in the objective functions has a formula of:

$$J_7(k) = \sum_{i=1}^{N} \delta_{sw}^2(k+i-1)$$

The accelerator control quantity in the objective functions has a formula of:

$$J_8(k) = \sum_{i=1}^{N} \rho^2(k+i-1)$$

The brake control quantity in the objective functions has a formula of:

$$J_9(k) = \sum_{i=1}^{N} P^2(k+i-1)$$

The longitudinal and lateral acceleration control to prevent motion sickness in the objective functions has a formula of:

$$J_{10}(k) = \sum_{i=1}^{N} \sqrt{a_x^2(k+i) + a_y^2(k+i)}$$

Then the cost function of the driver model has a formula of:

$$J(k) = \sum_{i=1}^{N} w_1 J_1(k) + w_2 J_2(k) + w_s J_s(k) + w_4 J_4(k) + w_5 J_5(k) + w_6 J_6(k) + w_7 J_7(k) + w_8 J_8(k) + w_9 J_9(k) + w_{10} J_{10}(k)$$

where $w_1$ to $w_{10}$ are weight coefficients of the respective objective functions, and for a common driver, the weight coefficients are $w_1 = 0.1 \cdot u_{xd}^2$, $w_2 = 0.047$, $w_3 = 0.02$, $w_4 = 0.008$, $w_5 = 0.0015$, $w_6 = 0.001$, $w_7 = 0.0447$, $w_8 = 0.01$, $w_9 = 0.0316$, $w_{10} = 0.17$ respectively.

Further, the driver model in step S3 includes a plurality of limit formulas, including avoiding exceeding lane range, maximum tolerable lateral acceleration, accelerator and brake limit formulas.

The avoiding exceeding lane range has a limit formula of:

$$-\frac{\text{lane range} - \text{vehicle width}}{2} \le y_{err} \le \frac{\text{lane range} - \text{vehicle width}}{2}$$

The maximum tolerable lateral acceleration has a limit formula of:

$$-1.67 \le a_y \le 1.67$$

The accelerator has a limit formula of:

$$0 \le \rho \le 1$$

The pressure value of the main pressure valve of the brake has a limit formula of:

$$0 \le P.$$

Compared with the prior art, the present invention has the following beneficial effects:

(1) The present invention controls the vehicle longitudinally and laterally in a cooperative manner, which solves the problem that the vehicle cannot reach the ideal state due to separate longitudinal and lateral controls, and improves the stability of the longitudinal-and-lateral control of the vehicle;

(2) The present invention uses a driver model established by a nonlinear model predictive control algorithm, which outputs desired velocity, desired acceleration, and desired wheel turning angle through input vehicle travelling state and road surface information. The parameters output at the previous time node are used as the parameters input at the next time node, and the travelling state of the vehicle is updated in real time to detect and control the vehicle in real time, with higher precision and security;

(3) The driver model of the present invention includes multiple objective functions for the longitudinal-and-lateral control, including not only objective functions for the safety and the efficiency but also an objective function for the motion sickness index to improve the passenger comfort, so that the vehicle is efficient and safe during automatic driving, and can avoid motion sickness of the passengers as much as possible;

(4) The driver model of the present invention uses the fmincon function in matlab to obtain the optimal solution to the limit formulas and the cost function composed of multiple objective functions, so as to obtain the most ideal vehicle travelling state.

DESCRIPTION OF EMBODIMENTS

The technical solutions of the embodiments of the present invention will be clearly and completely described in the following with reference to the accompanying drawings of the embodiments of the present invention. Apparently, the described embodiments are only some, but not all, embodiments of the present invention. Based on the embodiments of the present invention, all other embodiments obtained by the person skilled in the art without creative efforts fall into the protection scope of the present invention.

Figure 2:
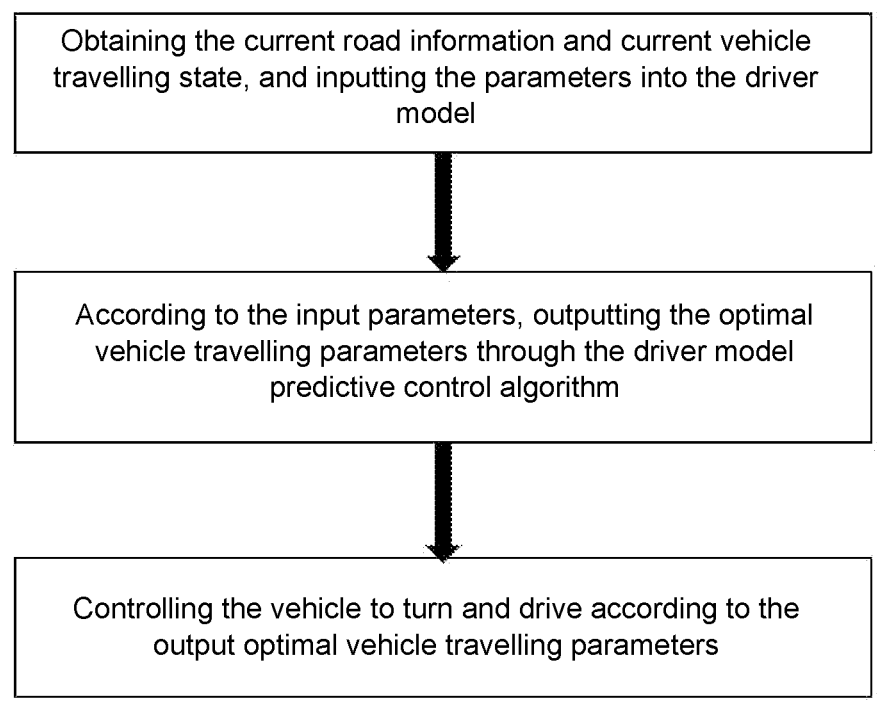
FIG. 2 is a flow chart of the control method of the present invention.

As shown in FIG. 2, an autonomous vehicle longitudinal-and-lateral control method for preventing motion sickness of the present invention includes the following steps:

S1: establishing a vehicle dynamics model;

The vehicle dynamics model includes a longitudinal dynamics model and a lateral dynamics model;

The formula of the longitudinal dynamic model is:

$$\dot{u}_x = \frac{F_{x,engine}}{m} - \frac{F_{x,brake}}{m} - \frac{F_{x,resis}}{m} + rv \qquad (1)$$

where, $F_{x,engine}$, $F_{x,brabe}$, $F_{x,resis}$ represent the engine output force, braking force, air resistance, respectively, $\dot{u}_x$ represents the vehicle longitudinal acceleration, r and v represent the yaw rate and vehicle lateral velocity, respectively.

The formula of the engine output force in formula (1) is:

$$F_{x,engine} = T_e \frac{N_t N_d \eta_{th}}{R_{tire}} \qquad (2)$$

where, $T_e$ represents the engine torque, $N_t$ represents the gearbox gear ratio, $N_d$ represents the differential gear ratio, $\eta_{th}$ represents the transmission efficiency and $R_{tire}$ represents the effective wheel rolling radius;

The formula for calculating the engine torque is as follows:

$$T_e = 160 \tanh(5(\rho-0.3))+133 \qquad (3)$$

where, $\rho$ represents the accelerator pedalling quantity;

The formula of the braking force in formula (1) is:

$$F_{x,brake} = \frac{(T_{brake,LF} + T_{brake,RF} + T_{brake,LR} + T_{brake,RR})P}{R_{tire}} \qquad (4)$$

where, $T_{brake}$ represents the ratio of the brake torque of the respective wheel to the pressure value of the pressure valve, and P represents the pressure value of the main pressure valve.

The formula of the air resistance in formula (1) is:

$$F_{x,resis} = C_a \cdot u_x^2 \qquad (5)$$

where $C_a$ is 0.4298;

The formula of the lateral dynamics model of the vehicle which is a linear two-degree-of-freedom vehicle model is:

$$\begin{bmatrix} \dot{u}_y \\ \dot{r} \end{bmatrix} = \begin{bmatrix} \frac{K_f + K_r}{Mu_x} & \frac{aK_f - bK_r}{Mu_x} - u_x \\ \frac{aK_f - bK_r}{u_x I_z} & \frac{a^2 K_f + b^2 K_r}{u_x I_z} \end{bmatrix} \begin{bmatrix} u_y \\ r \end{bmatrix} + \begin{bmatrix} -\frac{K_f}{M} \\ -\frac{aK_f}{I_z} \end{bmatrix} \delta \qquad (6)$$

where, M represents gross vehicle mass, $u_x$ represents vehicle forward velocity, $u_y$ represents vehicle lateral velocity, r represents vehicle yaw rate, $K_f$ and $K_r$ represent equivalent cornering stiffness of front and rear axles respectively, a and b represent distances from center of mass to the front and rear axles respectively, $\delta$ represents front wheel turning angle, and $I_z$ represents moment of inertia of the vehicle around z-axis;

S2: determining the current vehicle travelling state and road surface information according to the vehicle dynamics model;

where, the current vehicle travelling state in S2 includes X, Y, $u_x$, $u_y$, r, $\delta$;

X and Y represent the lateral and longitudinal positions of the vehicle respectively, $u_x$ and $u_y$ represent the vehicle longitudinal and lateral velocities respectively, r represents the vehicle yaw rate, and $\delta$ represents the front wheel turning angle; and the road surface information includes lane width and road turning radius $R_{road}$.

S3: after obtaining the vehicle travelling state and road surface information, outputting the desired velocity, desired acceleration, and desired wheel turning angle according to the driver model for reducing the occurrence of motion sickness while ensuring safety and efficiency;

The driver model includes predictive model, cost function including multiple objective functions and limit formula. The driver model is implemented by a nonlinear model predictive control method which is a basic algorithm. The optimal solution to the predictive model, the cost function and the limit formula is obtained by fmincon function in matlab to derive the optimal travel parameters, namely, to output the desired velocity, desired acceleration and desired wheel turning angle.

Figure 1:
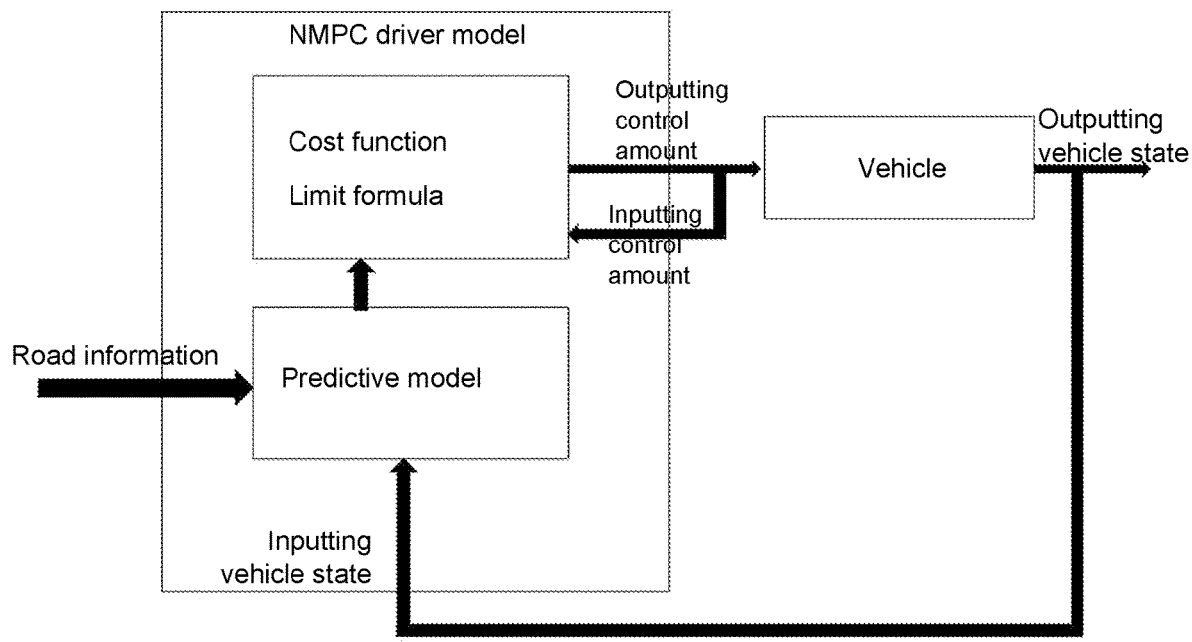
FIG. 1 is a diagram of NMPC driver model of the present invention.

As shown in FIG. 1, the current vehicle travelling state and the road surface information are first input into the driver model. The travel parameters are first input into the predictive model. In the predictive model, it is necessary to discretize the current parameters in order to derive the future state parameters. The optimal travel control parameters are derived through the predictive model, cost function, and limit formula, and output to control the vehicle laterally and longitudinally. When the cost function and limit formula are known, the fmincon function in Matlab is used to obtain the optimal solution.

where, it is necessary to discretize the current parameters in order to derive the future state parameters in the predictive model, and the formula of the discretized predictive model is:

$$\dot{X}(k) = \frac{X(k+1) - X(k)}{\Delta t} = f(X(k), 1/R_{road}(k), U(k))$$

The state parameter X and the control quantity U in this predictive model are calculated by $X=[u_x, y_{err}, u_y, \psi_{err}, r]$, $U=[\rho, P, \delta_{sw}]$, respectively, and $\Delta t$ represents the time interval. The initial state in the model framework corresponds to the current vehicle travelling state parameters, including vehicle longitudinal velocity $u_x$, lateral offset $y_{err}$, vehicle lateral velocity $u_y$, yaw rate difference $\psi_{err}$, and yaw rate r. The control quantity is the current vehicle control quantity, including the accelerator pedalling quantity $\rho$, the pressure value of the main pressure valve of the brake P, and the steering wheel turning angle $\delta_{sw}$.

The cost function is to multiply all objective functions by respective weights and add them up. The objective functions include time cost, desired velocity, reducing longitudinal acceleration, aligning the road center, reducing yaw angle error between the road and the vehicle, reducing lateral velocity, steering wheel control quantity, accelerator control quantity, brake control quantity, and longitudinal and lateral acceleration control to prevent motion sickness.

In the driver model, the formula of the time cost in the objective functions is:

$$J_1(k) = \sum_{i=1}^{N} \left(\frac{1}{u_x(k+i)}\right)^2$$

where, $u_x$ is the vehicle longitudinal velocity;

The formula of the desired velocity in the objective functions is:

$$J_2(k) = \sum_{i=1}^{N} (u_x(k+i) - u_{xd})^2$$

where, $u_{xd}$ is the desired vehicle longitudinal velocity;

The formula of the reducing longitudinal acceleration in the objective functions is:

$$J_3(k) = \sum_{i=1}^{N} \left(\frac{u_x(k+i) - u_x(k+i-1)}{\Delta t}\right)^2$$

The formula of the aligning the road center in the objective functions is:

$$J_4(k) = \sum_{i=1}^{N} y_{err}^2(k+i)$$

where, $y_{err}$ is the lateral offset, which is obtained by transforming the road coordinates, and the calculation formula thereof is:

$\dot{y}_{err} = u_y + u_x \cdot \psi_{err}$

The formula of the reducing the yaw angle error between the road and the vehicle in the objective functions is:

$$J_5(k) = \sum_{i=1}^{N} \psi_{err}^2(k+i)$$

where, $\psi_{err}$ is the yaw rate difference, and the calculation formula thereof is: $\psi_{err} = r - r_d$;

$$r_d = \frac{u_x}{R_{road}},$$

where $R_{road}$ is the road turning radius;

The formula of the reducing lateral velocity in the objective functions is:

$$J_6(k) = \sum_{i=1}^{N} u_y^2(k+i)$$

The formula of the steering wheel control quantity in the objective functions is:

$$J_7(k) = \sum_{i=1}^{N} \delta_{sw}^2(k+i-1)$$

The formula of the accelerator control quantity in the objective functions is:

$$J_8(k) = \sum_{i=1}^{N} \rho^2(k+i-1)$$

The formula of the brake control quantity in the objective functions is:

$$J_9(k) = \sum_{i=1}^{N} P^2(k+i-1)$$

The formula of the longitudinal and lateral acceleration control to prevent motion sickness in the objective functions is:

$$J_{10}(k) = \sum_{i=1}^{N} \sqrt{a_x^2(k+i) + a_y^2(k+i)}$$

Then, the cost function of the driver model is:

$$J(k) = \sum_{i=1}^{N} w_1 J_1(k) + w_2 J_2(k) + w_3 J_3(k) + w_4 J_4(k) + \\ w_5 J_5(k) + w_6 J_6(k) + w_7 J_7(k) + w_8 J_8(k) + w_9 J_9(k) + w_{10} J_{10}(k)$$

where $w_1$ to $w_{10}$ are weight coefficients of the respective objective functions. For a common driver, the weight coefficients are $w_1=0.1 \cdot u_{xd}^2$, $w_2=0.047$, $w_3=0.02$, $w_4=0.008$, $w_5=0.0015$, $w_6=0.001$, $w_7=0.0447$, $w_8=0.01$, $w_9=0.0316$, $w_{10}=0.17$ respectively.

The driver model in S3 includes a plurality of limit formulas, including avoiding exceeding the lane range, maximum tolerable lateral acceleration, accelerator and brake limit formulas;

The avoiding exceeding the lane range has a limit formula of:

$$-\frac{\text{lane range} - \text{vehicle width}}{2} \leq y_{err} \leq \frac{\text{lane range} - \text{vehicle width}}{2}$$

The maximum tolerable lateral acceleration has a limit formula of:

$-1.67 \leq a_y \leq 1.67$

The accelerator has a limit formula of:

$0 \leq \rho \leq 1$

The pressure value of the main pressure valve of the brake has a limit formula of:

$0 \leq P$

S4: carrying out longitudinal-and-lateral control of the vehicle

After obtaining the desired velocity, desired acceleration, and desired wheel turning angle, according to the current vehicle running state, the vehicle is longitudinally controlled by controlling the accelerator and the brake to reach the desired velocity and acceleration, and laterally controlled by controlling the steering wheel to reach the desired wheel turning angle, so as to make the current vehicle travelling state reach the desired travelling state.

S5: repeating steps S3-S4, re-inputting the output control quantity into the driver model as the control quantity for the next time node, meanwhile, re-inputting the controlled vehicle state into the driver model as an initial state, and updating the road surface information to derive the optimal travel control parameters again through the driver model, so as to provide a comfortable ride experience for the passenger.

Although the embodiments of the present invention have been shown and described, for the person skilled in the art, it can be understood that various changes, amendments, replacements and modifications can be made to these embodiments without departing from the principle and spirit of the present invention. The scope of the present invention is defined by the appended claims and their equivalents.

The invention claimed is:

1. An autonomous vehicle longitudinal-and-lateral control method for preventing motion sickness, comprising steps of:
S1: establishing a vehicle dynamics model;
S2: determining current vehicle travelling state and road surface information according to the vehicle dynamics model,
wherein the vehicle travelling state in S2 comprises X, Y, $u_x$, $u_y$, r, $\delta$;
where X and Y represent lateral and longitudinal positions of the vehicle respectively, $u_x$ and $u_y$ represent vehicle longitudinal and lateral velocities respectively, r represents vehicle yaw rate, and $\delta$ represents front wheel turning angle; and
the road surface information comprises lane width and road turning radius $R_{road}$;
S3: after obtaining the vehicle travelling state and the road surface information, outputting desired velocity, desired acceleration, and desired wheel turning angle according to a driver model for reducing occurrence of motion sickness while ensuring safety and efficiency;
wherein the driver model comprises predictive model, cost function comprising multiple objective functions and limit formula, and is implemented by a nonlinear model predictive control method which is a basic algorithm; and wherein an optimal solution is obtained by fmincon function in matlab through the predictive model, the cost function and the limit formula to derive optimal travel parameters, so as to output the desired velocity, the desired acceleration and the desired wheel turning angle;
S4: carrying out longitudinal-and-lateral control of the vehicle;
wherein after obtaining the desired velocity, the desired acceleration, and the desired wheel turning angle and according to current vehicle running state, the vehicle is longitudinally controlled by controlling an accelerator and a brake to reach the desired velocity and the desired acceleration respectively, and laterally controlled by controlling a steering wheel to reach the desired wheel turning angle, so as to make the current vehicle travelling state reach a desired travelling state; and
S5: repeating steps S3-S4, re-inputting output control quantity into the driver model as control quantity for next time node and controlled vehicle state into the driver model as initial state, and updating the road surface information to derive optimal travel control parameters again through the driver model, so as to provide comfortable ride experience for passenger;

wherein in step S1, the vehicle dynamics model includes a longitudinal dynamics model and a lateral dynamics model; and wherein
the longitudinal dynamic model has a formula of:

$$\dot{u}_x = \frac{F_{x,engine}}{m} - \frac{F_{x,brake}}{m} - \frac{F_{x,resis}}{m} + rv \quad (1)$$

where, $F_{x,engine}$, $F_{x,brabe}$, $F_{x,resis}$ represent engine output force, braking force, and air resistance, respectively, $\dot{u}_x$ represents vehicle longitudinal acceleration, r and v represent yaw rate and vehicle lateral velocity, respectively;
wherein the engine output force in formula (1) has a formula of:

$$F_{x,engine} = T_e \frac{N_t N_d \eta_{th}}{R_{tire}} \quad (2)$$

where, $T_e$ represents engine torque, $N_t$ represents gearbox gear ratio, $N_d$ represents differential gear ratio, $\eta_{th}$ represents transmission efficiency and $R_{tire}$ represents effective wheel rolling radius;
where, the engine torque has a formula of:

$$T_e = 160 \tanh(5(\rho - 0.3)) + 133 \quad (3)$$

where, $\rho$ represents accelerator pedalling quantity;
wherein the braking force in formula (1) has a formula of:

$$F_{x,brake} = \frac{(T_{brake,LF} + T_{brake,RF} + T_{brake,LR} + T_{brake,RR})P}{R_{tire}} \quad (4)$$

where, $T_{brake}$ in formula (4) represents a ratio of a brake torque of a respective wheel to a pressure valve of a pressure valve, and P represents a pressure value of a main pressure valve; and
wherein the air resistance in formula (1) has a formula of:

$$F_{x,resis} = C_a \cdot u_x^2 \quad (5)$$

where $C_a$ is 0.4298; and
wherein the lateral dynamics model is a linear two-degree-of-freedom vehicle model, and has a formula of:

$$\begin{bmatrix} \dot{u}_y \\ \dot{r} \end{bmatrix} = \begin{bmatrix} \frac{K_f + K_r}{M u_x} & \frac{aK_f - bK_r}{M u_x} - u_x \\ \frac{aK_f - bK_r}{u_x I_z} & \frac{a^2 K_f + b^2 K_r}{u_x I_z} \end{bmatrix} \begin{bmatrix} u_y \\ r \end{bmatrix} + \begin{bmatrix} -\frac{K_f}{M} \\ -\frac{aK_f}{I_z} \end{bmatrix} \delta \quad (6)$$

where, M represents gross vehicle mass, $u_x$ represents vehicle forward velocity, $u_y$ represents vehicle lateral velocity, r represents vehicle yaw rate, $K_f$ and $K_r$ represent equivalent cornering stiffness of front and rear axles respectively, a and b represent distances from center of mass to the front and rear axles respectively, $\delta$ represents front wheel turning angle, and $I_z$ represents moment of inertia of the vehicle around z-axis;

wherein in step S2, current parameters must be discretized to derive future state parameters in the predictive model, and the discretized predictive model has a formula of:

$$\dot{X}(k) = \frac{X(k+1) - X(k)}{\Delta t} = f(X(k), 1/R_{road}(k), U(k))$$

where the state parameter X and the control quantity U in the predictive model are respectively calculated by $X=[u_x, y_{err}, u_y, \psi_{err}, r]$ and $U=[\rho, P, \delta_{sw}]$, and $\Delta t$ represents time interval; and wherein the initial state in a model framework corresponds to current vehicle travelling state parameters, comprising vehicle longitudinal velocity $u_x$, lateral offset $y_{err}$, vehicle lateral velocity $u_y$, yaw rate difference $\psi_{err}$, and yaw rate r; and the control quantity is current vehicle control quantity, comprising accelerator pedalling quantity $\rho$, pressure value of a main pressure valve of the brake P, and steering wheel turning angle $\delta sw$;

wherein in step S3, the cost function is to multiply all objective functions by respective weights and add them up, and the objective functions comprise time cost, desired velocity, reducing longitudinal acceleration, aligning road center, reducing yaw angle error between road and vehicle, reducing lateral velocity, steering wheel control quantity, accelerator control quantity, brake control quantity, and longitudinal and lateral acceleration control to prevent motion sickness; and wherein in the driver model, the time cost in the objective functions has a formula of:

$$J_1(k) = \sum_{i=1}^{N}\left(\frac{1}{u_x(k+i)}\right)^2$$

where, $u_x$ represents vehicle longitudinal velocity;
the desired velocity in the objective functions has a formula of:

$$J_2(k) = \sum_{i=1}^{N}(u_x(k+i) - u_{xd})^2$$

where, $u_{xd}$ represents desired vehicle longitudinal velocity;
the reducing longitudinal acceleration in the objective functions has a formula of:

$$J_3(k) = \sum_{i=1}^{N}\left(\frac{u_x(k+i) - u_x(k+i-1)}{\Delta t}\right)^2$$

the aligning road center in the objective functions has a formula of:

$$J_4(k) = \sum_{i=1}^{N} y_{err}^2(k+i)$$

where, $y_{err}$ represents lateral offset, which is obtained by transforming road coordinates, and has a formula of:

$$\dot{y}_{err} = u_y + u_x \cdot \psi_{err}$$

the reducing yaw angle error between road and vehicle in the objective functions has a formula of:

$$J_5(k) = \sum_{i=1}^{N} \psi_{err}^2(k+i)$$

where, $\psi_{err}$ represents yaw rate difference and has a formula of $\psi_{err} = r - r_d$;
where, $$r_d = \frac{u_x}{R_{road}},$$

$R_{road}$ represents road turning radius;
the reducing lateral velocity in the objective functions has a formula of:

$$J_6(k) = \sum_{i=1}^{N} u_y^2(k+i)$$

the steering wheel control quantity in the objective functions has a formula of:

$$J_7(k) = \sum_{i=1}^{N} \delta_{sw}^2(k+i-1)$$

the accelerator control quantity in the objective functions has a formula of:

$$J_8(k) = \sum_{i=1}^{N} \rho^2(k+i-1)$$

the brake control quantity in the objective functions has a formula of:

$$J_9(k) = \sum_{i=1}^{N} P^2(k+i-1)$$

the longitudinal and lateral acceleration control to prevent motion sickness in the objective functions has a formula of:

$$J_{10}(k) = \sum_{i=1}^{N} \sqrt{a_x^2(k+i) + a_y^2(k+i)}$$

then the cost function of the driver model has a formula of:

$$J(k) = \sum_{i=1}^{N} w_1 J_1(k) + w_2 J_2(k) + w_s J_s(k) + w_4 J_4(k) + w_5 J_5(k) + w_6 J_6(k) + w_7 J_7(k) + w_8 J_8(k) + w_9 J_9(k) + w_{10} J_{10}(k)$$

where $w_1$ to $w_{10}$ are weight coefficients of the respective objective functions, and for a common driver, the weight coefficients are $w_1 = 0.1 \cdot u_{xd}^2$, $w_2 = 0.047$, $w_3 = 0.02$, $w_4 = 0.008$, $w_5 = 0.0015$, $w_6 = 0.001$, $w_7 = 0.0447$, $w_8 = 0.01$, $w_9 = 0.0316$, $w_{10} = 0.17$ respectively.

2. The autonomous vehicle longitudinal-and-lateral control method of claim 1, wherein the driver model in step S3 comprises a plurality of limit formulas, comprising avoiding exceeding lane range, maximum tolerable lateral acceleration, accelerator and brake limit formulas; and wherein
the avoiding exceeding lane range has a limit formula of:

$$-\frac{\text{lane range} - \text{vehicle width}}{2} \leq y_{err} \leq \frac{\text{lane range} - \text{vehicle width}}{2}$$

the maximum tolerable lateral acceleration has a limit formula of:

$-1.67 \leq a_y \leq 1.67$ the accelerator has a limit formula of:

$0 \leq \rho \leq 1$ the pressure value of the main pressure valve of the brake has a limit formula of:

$0 \leq P$.

* * * * *